United States Patent
Maeda et al.

[11] Patent Number: 5,828,470
[45] Date of Patent: Oct. 27, 1998

[54] COLOR VALUES PROCESSING APPARATUS CAPABLE OF OPTIMIZING A PROCESSING DESCRIPTION

[75] Inventors: Masahiro Maeda; Noriaki Seki; Masayuki Kurahashi; Toshiyuki Tsuzuki; Toru Yamasaki, all of Kanagawa, Japan

[73] Assignee: Fuji Xerox Co., Ltd., Tokyo, Japan

[21] Appl. No.: 839,966

[22] Filed: Apr. 24, 1997

Related U.S. Application Data

[63] Continuation of Ser. No. 425,775, Apr. 20, 1995, abandoned, which is a continuation of Ser. No. 106,716, Aug. 16, 1993, abandoned.

[30] Foreign Application Priority Data

Aug. 17, 1992  [JP]  Japan ................................. 4-238849

[51] Int. Cl.$^6$ ............................... H04N 1/46; G03F 3/08
[52] U.S. Cl. .......................... 358/504; 358/523; 358/530; 395/1; 395/11
[58] Field of Search .................................. 358/504, 500, 358/518, 519, 523, 524, 526, 527, 448, 530; 395/1, 11, 20, 23, 567, 583, 595; 382/162, 167, 165; H04N 1/46

[56] References Cited

U.S. PATENT DOCUMENTS

| | | | |
|---|---|---|---|
| H1506 | 12/1995 | Beretta | 345/199 |
| 4,679,074 | 7/1987 | Sugiura et al. | 358/523 |
| 4,885,705 | 12/1989 | Choi | 364/525 |
| 4,956,704 | 9/1990 | Yamada | 358/523 |
| 5,065,234 | 11/1991 | Hung et al. | 358/517 |
| 5,073,818 | 12/1991 | Iida | 358/523 |
| 5,121,198 | 6/1992 | Maronian | 358/527 |
| 5,155,587 | 10/1992 | Itoh | 358/515 |
| 5,200,816 | 4/1993 | Rose | 358/518 |
| 5,208,911 | 5/1993 | Newman et al. | 358/518 |
| 5,265,200 | 11/1993 | Edgar | 358/518 |
| 5,289,295 | 2/1994 | Yumiba et al. | 358/515 |
| 5,295,204 | 3/1994 | Parucski | 358/518 |

FOREIGN PATENT DOCUMENTS

| | | |
|---|---|---|
| 0 179 334 A3 | 4/1986 | European Pat. Off. . |
| 0 486 311 A3 | 5/1992 | European Pat. Off. . |
| WO 92/06557 | 4/1992 | WIPO . |

OTHER PUBLICATIONS

ISO/IEC JTC 1/SC 18 N 3264, "First Working Draft of Text and Office Systems Colour Architecture" (TOSCA).

Barry J. Shepherd, "Addendum 2 To [CCITT Rec T.412/Part 2 of ISO 8613]".

Xerox Corporation, "Color Encoding Standard", XNSS 289107, Jul. 1991.

"Addendum 2 To [CCIIT Rec T.411/Part 1 of ISO 8613]" Barry J. Shepherd, IBM Corporation.

Toru Yamasaki, "Color Technologies for Document Exchange," Journal of the Inst. of Image Electronics Engineers of Japan, vol. 20, No. 6, pp. 617–622.

*Primary Examiner*—Edward L. Coles
*Assistant Examiner*—Madeleine Au Nguyen
*Attorney, Agent, or Firm*—Finnegan, Henderson, Farabow, Garrett & Dunner, L.L.P.

[57] ABSTRACT

A color values processing description which represents a procedure of color values processing is analyzed by use of a partial reservation table and a total reservation table. The color values processing description is changed based on results of the analysis. For example, two consecutive operations of the same type, such as normalizing operations, gamma correcting operations or look-up table referencing operations, are unified into a single operation.

11 Claims, 18 Drawing Sheets

FIG. 3

```
/* NCA  Procedure syntax */

<NCA_Procedure> ::=  <BEGIN> <NCA_Transform_attribute_list>
<END>;

<NCA_Transform_attribute_list>  ::= <NCA ATTRIBUTE> |
<NCA_Transform_attribute_list><SEPARATOR><NCA_ATTRIBUTE>

<NCA_ATTRIBUTE> ::= <NCA_ATTRIBUTE_NAME> <ATTRIBUTE_SEPARATOR>
<VALUE>
    | "procedure list" <ATTRIBUTE_SEPARATOR> <NCA_PRIMITIVE_LIST>;
<NCA_ATTRIBUTE_NAME> ::= "name"
    | "input_colorspace" | "output colorspace"
    | "input_range" | "output_range"
    | "input_round_proc" | "output_round_proc";

<NCA_PRIMITIVE_LIST> ::= <BEGIN><NCA_PRIMITIVE_SEQUENCE><END>
    | <NCA_PRIMITIVE>;
<NCA_PRIMITIVE_SEQUENCE>::= <NCA_PRIMITIVE>
    | <NCA_PRIMITIVE_SEQUENCE><SEPARATOR><NCA_PRIMITIVE>;
<NCA PRIMITIVE> ::= <BEGIN> <NCA_PRIMITIVE_ATTRIBUTE_LIST> <END>;
<NCA_PRIMITIVE_ATTRIBUTE_LIST> ::= <NCA_PRIMITIVE_ATTRIBUTE>
    |
<NCA_PRIMITIVE_ATTRIBUTE_LIST><SEPARATOR><NCA_PRIMITIVE_ATTRIBUTE>
;

<NCA_PRIMITIVE_ATTRIBUTE> ::=
    <NCA_PRIMITIVE_ATTRIBUTE_NAME> <ATTRIBUTE_SEPARATOR> <VALUE>;

<NCA_PRIMITIVE_ATTRIBUTE_NAME>  ::= "type" | "base" | "parameter"
| "min" | "max"
    | "round_min" | "round_max";

<BEGIN>  ::= <IGNORE_SPACE><L_BRACE><IGNORE_SPACE>;
<END>    ::= <IGNORE_SPACE><R_BRACE><IGNORE_SPACE>;
<SEPARATOR>  ::= <IGNORE_SPACE><COMMA><IGNORE_SPACE>;
<TERMINATOR> ::= <IGNORE_SPACE><SEMICOLON><IGNORE_SPACE>;
<ATTRIBUTE_SEPARATOR>::= <IGNORE_SPACE><COLON><IGNORE_SPACE>;
<IGNORE_SPACE>   ::= NULL | <IGNORE_SPACE><SPACES>;
<SPACES>::= <SPACE> | <TAB> | <CR>;
<L_BRACE>   ::= "{";
<R_BRACE>   ::= "}";
<COMMA>     ::= ",";
<PERIOD>::= ".";
<COLON>     ::= ":";
<SEMICOLON>    ::= ";";
<CR>      ::= "\n";
<SPACE>     ::= " ";
<TAB>     ::= "\t";
<NUM>    ::= [0-9];
<ALPHABET> ::= [a-zA-Z];
```

FIG. 4

```
XYZ2CIE_RGB{
  name:"XYZ2CIE_RGB",
  input_colorspace:"XYZ",
  output_colorspace:"CIE_RGB",
  procedure_list:{
     type:"MATRIX",
     parameter:{
        {2.3643,-0.8968,-0.4679},
        {-0.5154,1.4262,0.0887},
        {0.0051,-0.0141,1.0092}
     }
  }
}
```

FIG. 6

25
TOTAL RESERVATION WORDS TABLE

| RESERVATION WORD | OPERATION |
|---|---|
| { | pushdown |
| } | popup |
| ... | ... |

24-1
PARTIAL RESERVATION WORDS TABLE

| RESERVATION WORD | OPERATION |
|---|---|
| name | name_entry |
| input_colorspace | input_colorspace_entry |
| output_colorspace | output_colorspace_entry |
| input_range | input_range_entry |
| output_range | output_range_entry |
| input_round_proc | input_round_proc_entry |
| output_round_proc | output_round_proc_entry |
| procedure_list | procedure_list_entry & pushdown |

24-2
PARTIAL RESERVATION WORDS TABLE

| RESERVATION WORD | OPERATION |
|---|---|
| { | pushdown |
| } | terminate & popup |
| type | type_entry |
| base | parameter_entry |
| parameter | parameter_entry |
| input_range | input_range_entry |
| output_range | output_range_entry |
| input_round_proc | input_round_proc_entry |
| output_round_proc | output_round_proc_entry |

FIG. 16

(a) WITHOUT ACCELERATOR

| BEFORE CONVERSION | AFTER CONVERSION | COST DIFFERENCE |
|---|---|---|
| GAMMA CORRECTION | LUT REFERENCING | -250% |
| Log CORRECTION | LUT REFERENCING | -500% |
| ... | ... | ... |

(b) WITH ACCELERATOR

| BEFORE CONVERSION | AFTER CONVERSION | COST DIFFERENCE |
|---|---|---|
| GAMMA CORRECTION | LUT REFERENCING | 0% |
| Log CORRECTION | LUT REFERENCING | 0% |
| ... | ... | ... |

COLOR VALUES PROCESSING APPARATUS CAPABLE OF OPTIMIZING A PROCESSING DESCRIPTION

This is a continuation of application Ser. No. 08/425,775, filed Apr. 20, 1995, which is a continuation of application Ser. No. 08/106,716, filed Aug. 16, 1993, both now abandoned.

BACKGROUND OF THE INVENTION

The present invention relates to a color values processing apparatus capable of performing color processing at high speed and with high accuracy in document processing.

In generating and outputting a color document, for instance, in outputting by a printer a color document displayed on a CRT, there are needed operations such as converting a color expression based on an additive mixture system used with the CRT to that based on a subtractive mixture system with printing inks.

There exist following references which relate to the above color processing.

1) CES (Color Encoding Standard) XNSS-289107

This is a standard for representing a color in a PDL called InterPress (standard used in Fuji Xerox Co., Ltd.) and a RES (Raster Encoding Standard).

2) ISO, Information Processing—Text and Office Systems—Office Document Architecture (ODA) and Interchange Format Amendment 2: Support for Color (October 1991), ISO-DIS 8613/Amd. 2

This is a standard for represent a color in an ODA document. Correction data in a 3×3 matrix, a look-up table or other forms can be used in the standard.

3) Toru Yamasaki, "Color Technologies for Document Exchange," Journal of the Institute of Image Electronics Engineers of Japan, Vol. 20, No. 6, pp. 617–622.

This paper describes results of a survey on color technologies in the document exchange.

As described in reference 3), the above type of conventional color processing systems are constructed with the assumption that the color processing is performed by individual devices such as an image scanner, printer and CRT display; that is, they are not provided in a unified manner. As a result, the conventional color processing systems cannot accommodate the case where an individual device cannot perform color processing and therefore a conversion operation is necessary.

Conventionally, since respective steps of a color-related portion of a document processing are performed independently of each other, a bottleneck may occur due to differences in processing capability among the respective steps and there cannot be performed an optimization by totally considering all the steps.

SUMMARY OF THE INVENTION

An object of the present invention is to enable dynamic optimization of color processing itself, to thereby make it possible to perform the color processing at high speed and with high accuracy.

Referring to FIG. 1, a color values processing apparatus according to the invention has, as basic constitution, a color values processing description storing means 12 for storing a color values processing description which represents a procedure of processing color values, a color values processing description analyzing means 13 for analyzing the color values processing description, a color values processing description changing means 14 for changing the procedure of the color values processing description, a color values processing means 11 for processing color values of a pixel based on the procedure of the color values processing description.

With the above constitution, the color values processing procedure, which is written in a prescribed color values processing description syntax, is stored in the color values processing description storing means 12. The color values processing description analyzing means analyzes the color values processing description. After the color values processing description changing means 14 has changed the color values processing description based on the analysis results in accordance with a purpose of the process, the color values processing means 11 processes color values based on the color processing description thus changed.

According to the invention, since the color processing description can be changed, the color values processing can be optimized dynamically and thereby performed at high speed with high accuracy. The degree of freedom of the process can be increased. Further, since the color values processing description does not depend on the processing system, it becomes possible to interchange processes.

BRIEF DESCRIPTION OF THE DRAWINGS

FIG. 3 shows an example of a color values processing description syntax;

FIG. 4 is an example of a color values processing description according to the syntax of FIG. 3;

FIG. 6 shows an example of reservation words tables used in a color values processing description analysis;

FIG. 16 shows examples of processing cost difference tables for operation replacement;

DESCRIPTION OF THE PREFERRED EMBODIMENTS

Embodiments of the present invention are described hereinafter with reference to the accompanying drawings.

First embodiment

Figure 1:
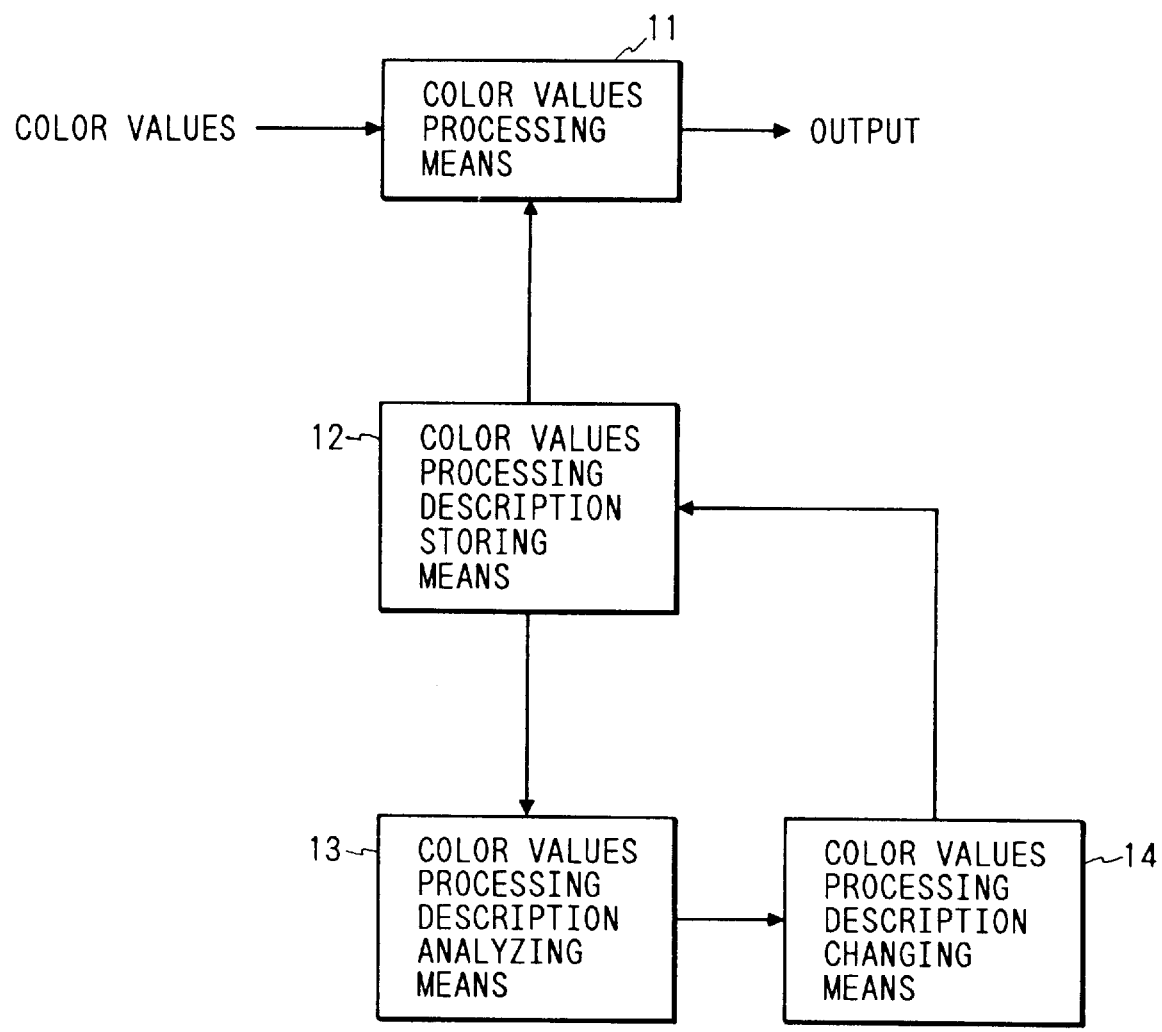
FIG. 1 is a block diagram showing basic constitution of the present invention.
Figure 2:
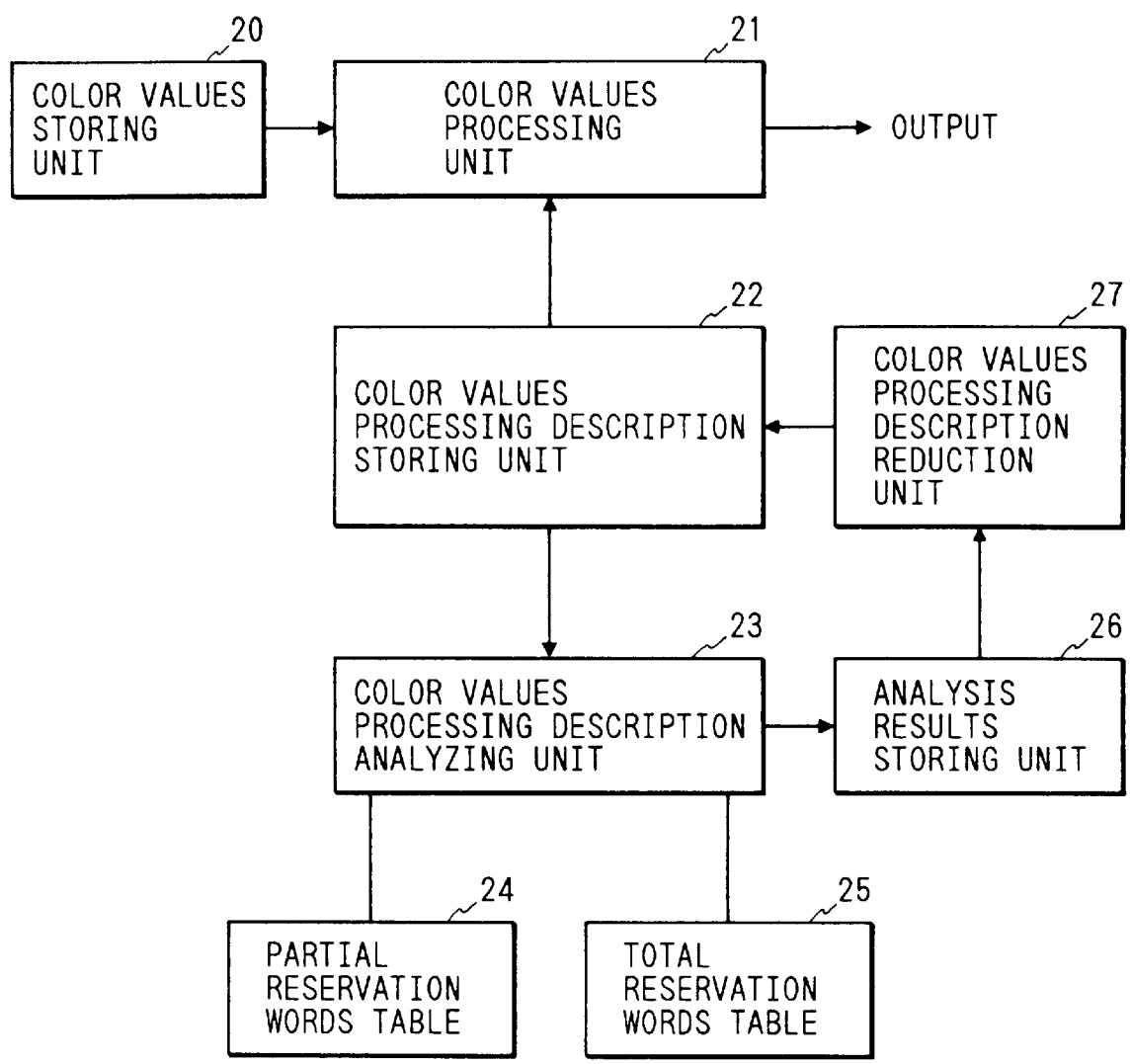
FIG. 2 is a block diagram showing constitution of a first embodiment of the invention.

FIG. 2 is a block diagram showing general constitution of a color values processing apparatus according to a first embodiment of the invention. The color values processing apparatus consists of a color values storing unit 20 for storing color values of a pixel, a color values processing unit 21 for performing color values operations on the color values stored in the color values storing unit 20 in accordance with a content of a color values processing description stored in a color values processing description storing unit 22, the color values processing description storing unit 22 for storing the color values processing description that describes a color values processing procedure according to a certain form, a color values processing description analyzing unit 23 for analyzing the color values processing description stored in the color values processing description storing unit 22, a partial reservation words table 24 and a total reservation words table 25 to be used in the analysis by the unit 23, an analysis results storing unit 26 for storing results of the analysis by the unit 23, and a color values processing description reduction unit 27 for reducing the color values processing description based on the analysis results.

FIG. 3 shows an example of color values processing description syntax for representing the color values processing procedure that is to be stored in the color values processing description storing unit 22. The syntax of FIG. 3, in which the description grammar is written in the known BNF method, is a grammar mainly intended for the color system conversion.

FIG. 4 shows an example of a description of color values processing, which represents a procedure of conversion from the XYZ color system to the CIE RGB color system. In FIG. 4, "input_colorspace: "XYZ"" represents a color system before the conversion, and "output_color space: "CIE_RGB"" represents a color system after the conversion. The procedure itself is described after "procedure_list:." In this case, "type: "MATRIX"" means that a matrix operation is performed, in which matrix components described in "parameter: {. . . }" are used.

Figure 5:
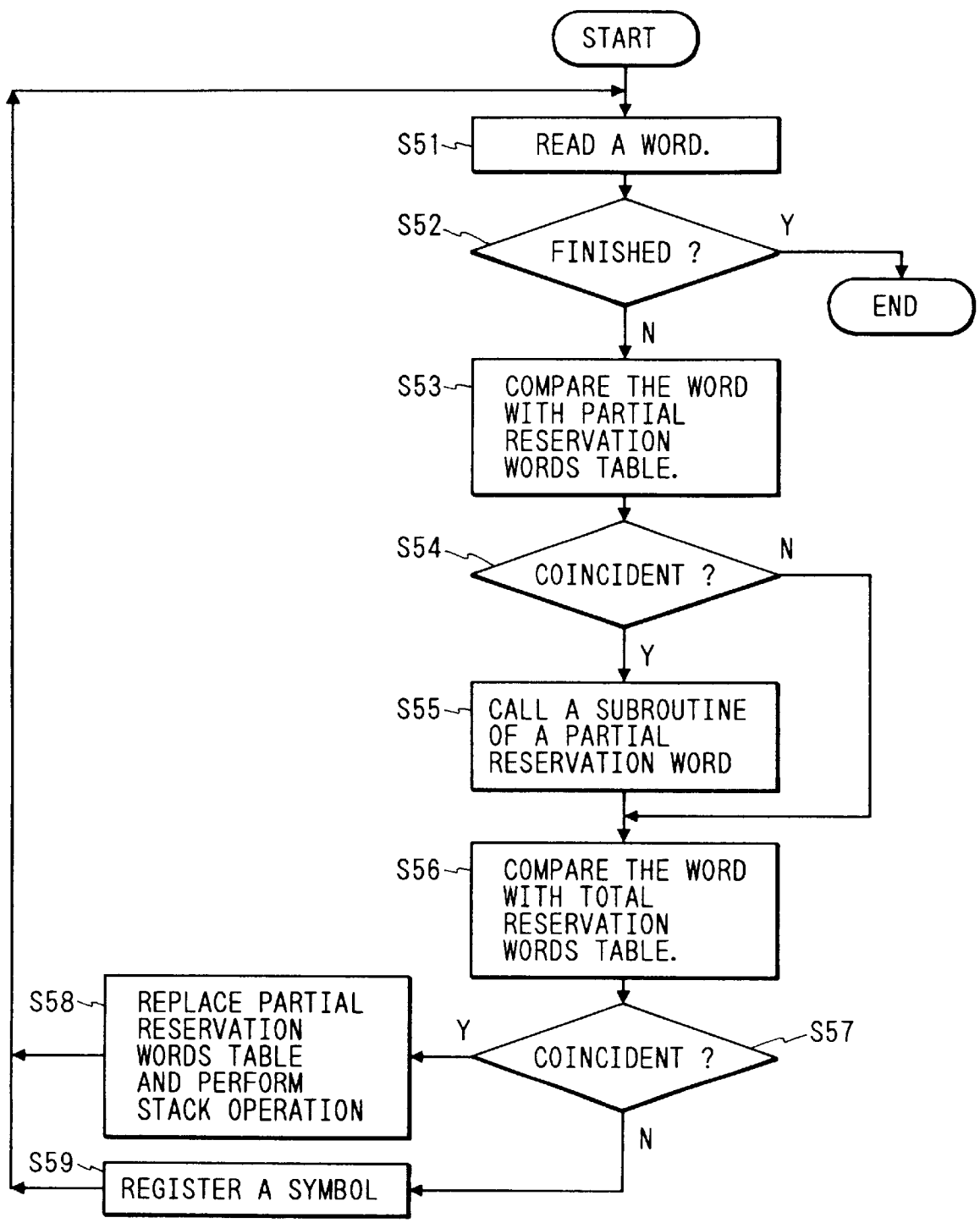
FIG. 5 is a flowchart showing an example of the operation of a color values processing description analyzing unit.

FIG. 5 is a flowchart showing an example of the operation of the color values processing description analyzing unit 23. For the description analysis, an analyzing program may be generated by a parser generator based on the syntax of FIG. 3. The flowchart of FIG. 5 mainly consists of table retrieval and table conversion.

In step S51, one of the words of the color values processing description is read from the color values processing description storing unit 22. In step S52, it is judged whether all the words have been processed. If the judgment is affirmative, the analysis is finished. If the judgment is negative, the following process is effected for the word just read.

First, in step S53 the word is compared with words of the partial reservation words table 24. If a partial reservation word is found in the table 24 that coincides with the word read above (step S54), in step S55 a subroutine corresponding to that reservation word is called and executed. When the execution of the subroutine is finished or if no reservation word is found in the partial reservation words table 24 (step S54), in step S56 the word read above is compared with words of the total reservation words table 25. If a reservation word is found that coincides with the word read above (step S57), in step S58 the partial reservation words table 24 is replaced and a stack operation is performed. If no reservation word is found in the total reservation words table 25 (step S57), a symbol is registered in step S59.

FIG. 6 shows an example of the reservation words tables. Reservation words to be applied to the entire description are set in the total reservation words table 25. Reservation words to be applied to a partial description are set in the partial reservation words tables 24-1 and 24-2, which are replaced with each other in accordance with the situation to change the analyzing mode. In the example of FIG. 6, the partial reservation words table 24-1 used for analysis of the entire color values processing description, and the partial reservation words table 24-2 is used for its specific description of a parameter analysis "procedure_list."

Figure 7:
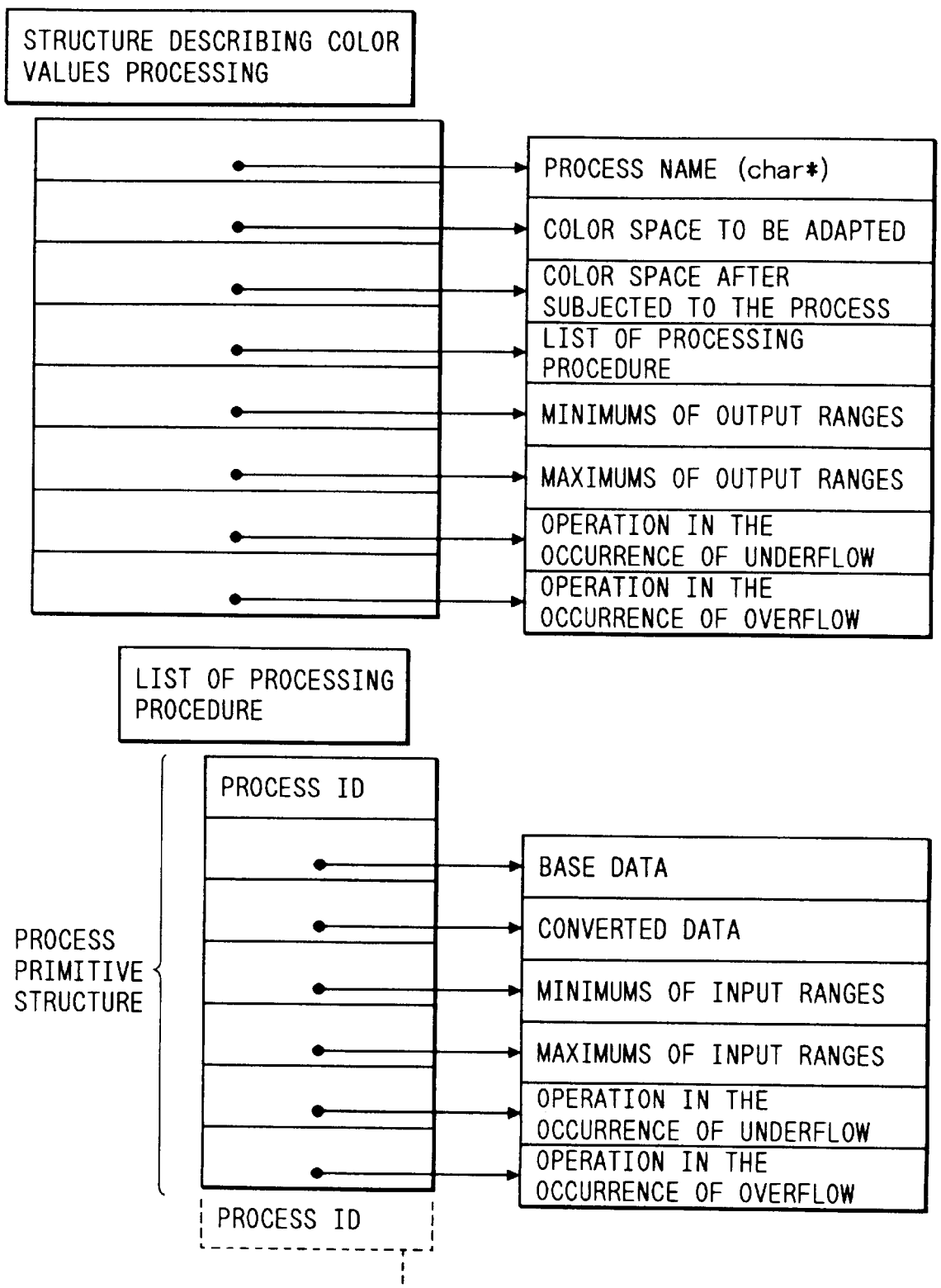
FIG. 7 shows an example of analysis results of a color values processing description.

Most of operations of the reservation words tables are simple conversion to an internal expression. FIG. 7 shows examples of analysis results that are stored in the analysis results storing unit 26. In these examples, the analysis result takes a form called a "structure" which depends on the programming language, i.e., depends on the processing system.

The color values processing description reduction unit 27 reduces the color values processing description based on the above analysis results.

Figure 8:
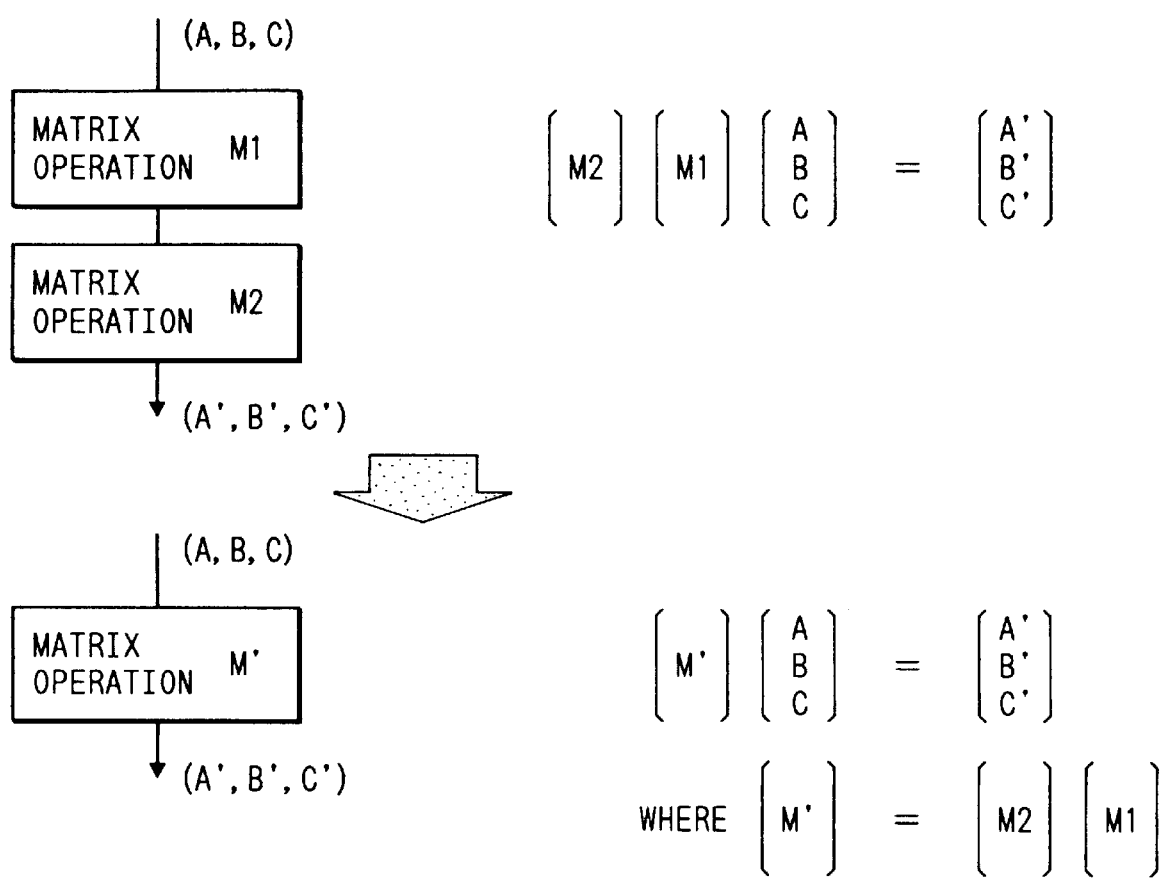
FIG. 8 shows a conversion from two consecutive matrix operations to a single matrix operation.

FIG. 8 shows an example of altering the procedure of the color values processing description. In this example, two consecutive matrix operations of the color values processing procedure are replaced with a single matrix operation, to halve the actual operation. For example, if a matrix M1 is for. conversion from the RGB color system of a CRT to the XYZ color system and a matrix M2 is for conversion from the XYZ color system to the CMY color system of a printer, the procedure of the conversion via the XYZ color system can be changed to a direct conversion procedure. Therefore, it becomes possible to connect various devices in any combination only by having procedures for mutual conversion with the XYZ color system prepared in the respective devices. Further, since direct conversion is performed in actually calculating the color values, there can be obtained an advantage of reduction of processing costs.

The above procedure is very advantageous when it is applied to a plural sets of color values, for instance, tens of thousands of pixel color values in image processing.

The procedure alteration (reduction) by unifying operations of the same kind in the above manner can also be applied to the normalizing operation, gamma correction operation and look-up table referencing operation.

The normalizing operation itself is represented in the form of dividing an input value by a reference value. In the case of two consecutive normalizing operations, an input value is first divided by reference value 1 and then by reference value 2, which results in (input value)/{(reference value 1)×(reference value 2)}. Therefore, these two operations are changed to a single normalizing operation having (reference value 1)×(reference value 2) as a new reference value.

The gamma correction operation is an operation of rasing an input value to the γth power (γ: gamma parameter). Therefore, two consecutive gamma correction operations are changed to a single gamma operation having a product of two power values as a new gamma parameter (see FIG. 9).

The look-up table referencing operation is an operation of accessing an array using an input value as its address and outputting an accessed entry. Therefore, two look-up table referencing operations are changed to a single look-up table referencing operation in which a new table has, as its entries, results of two times of referencing for all the input values (see FIG. 10).

Figure 11:
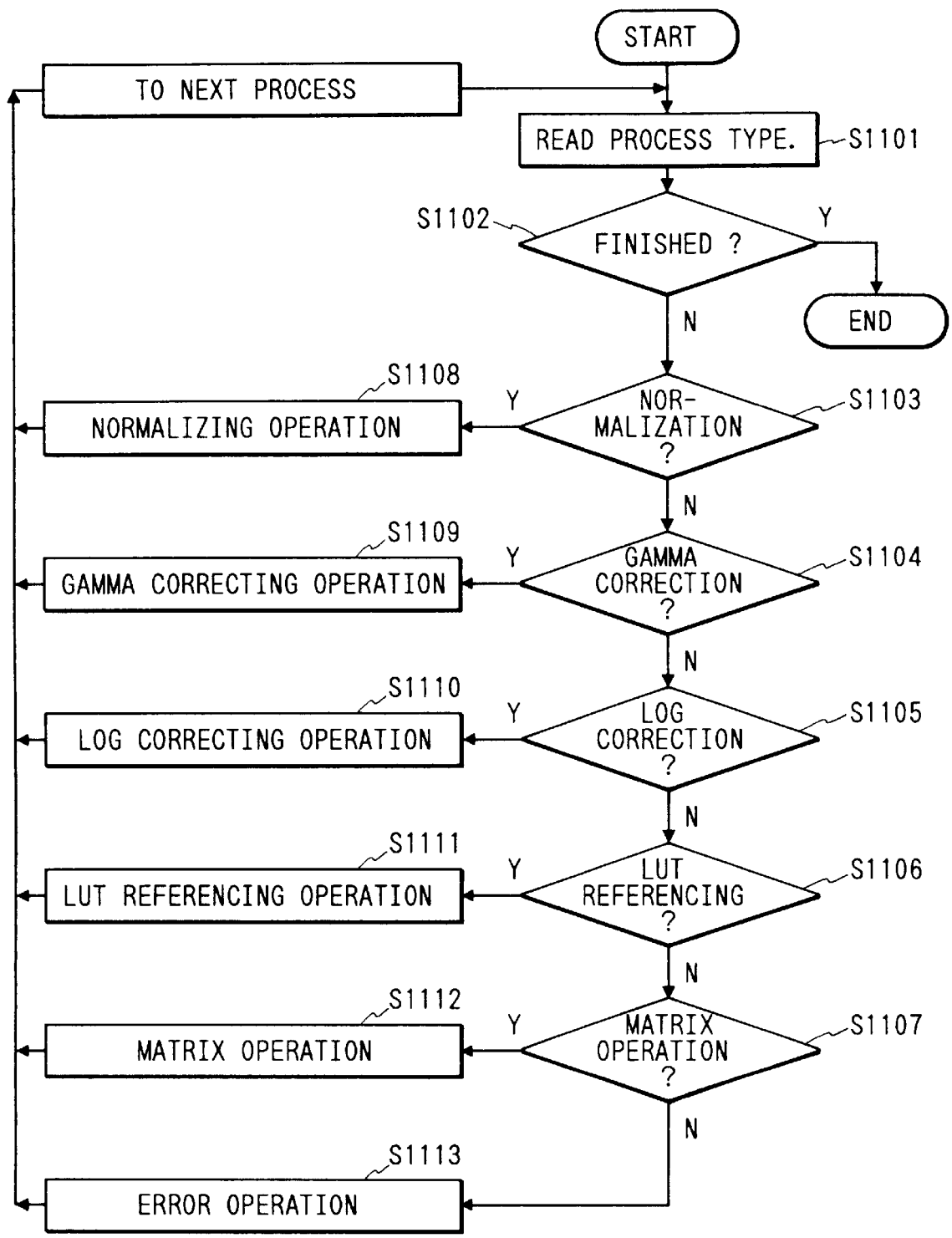
FIG. 11 is a flowchart showing an example of the operation of a color values processing unit.

The color values processing unit 21 processes actual color values after a color values processing description that represents a final processing procedure. FIG. 11 is a flowchart showing an example of the operation of the unit 21. In this example, the color values processing is a combination of the basic operations including normalization, gamma correction, logarithmic correction, look-up table referencing and matrix operation, and the operation type is judged for respective steps of the processing procedure (steps S1103–S1107) and performing corresponding operations (steps S1108–S1113).

A raster image is an example of color values to which the above type of processing is to be applied. Since a raster image is associated with an extremely large number of pixel values, the processing cost can be reduced in proportion to the number of pixel values when one kind of color values processing is simplified.

Second embodiment

Figure 12:
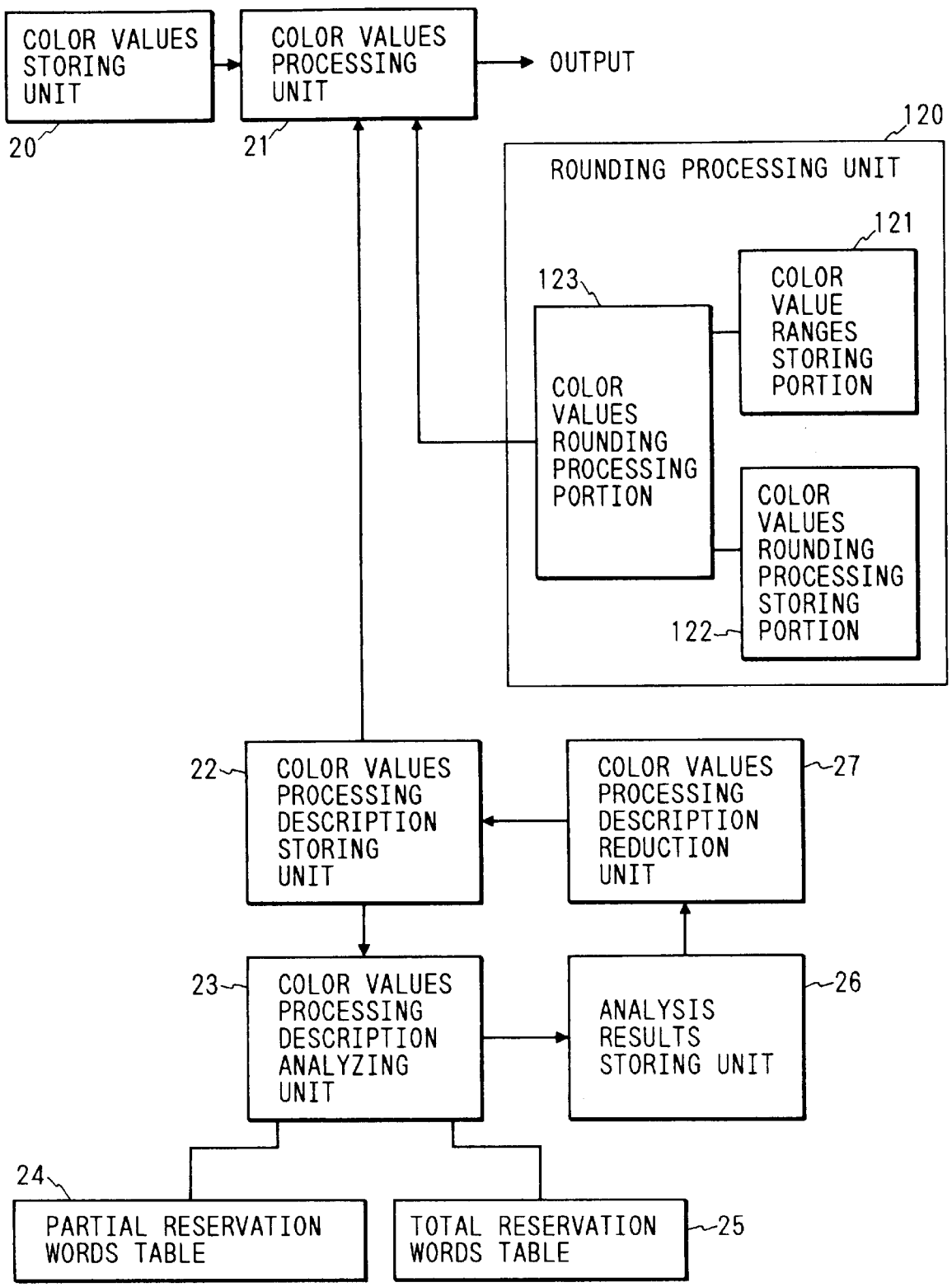
FIG. 12 is a block diagram showing constitution of a second embodiment of the invention.

As shown in a block diagram of FIG. 12, a second embodiment has constitution in which a rounding processing unit 120 is added to the first embodiment. That is, in FIG. 12, the color values storing unit 20, color values processing unit 21, color values processing description storing unit 22, color values processing description analyzing unit 23, partial reservation words table 24, total reservation words table 25, analysis results storing unit 26 and color values processing description reduction unit 27 are the same as those of the first embodiment of FIG. 2. In FIG. 12, the same units as in FIG. 2 are represented by the same reference numerals. (Similarly in the following embodiments, the same functional units are given the same reference numerals.)

The rounding processing unit 120, which is added in the second embodiment, consists of a color value ranges storing portion 121 for storing ranges of color values, a color values rounding processing storing portion 122 for storing a value indicating an operation to be effected when a color value exceeds the range stored in the color value ranges storing portion 121, and a color values rounding processing portion 123 for performing a color values rounding operation in accordance with the value stored in the color values rounding processing storing portion 122.

Figure 13:
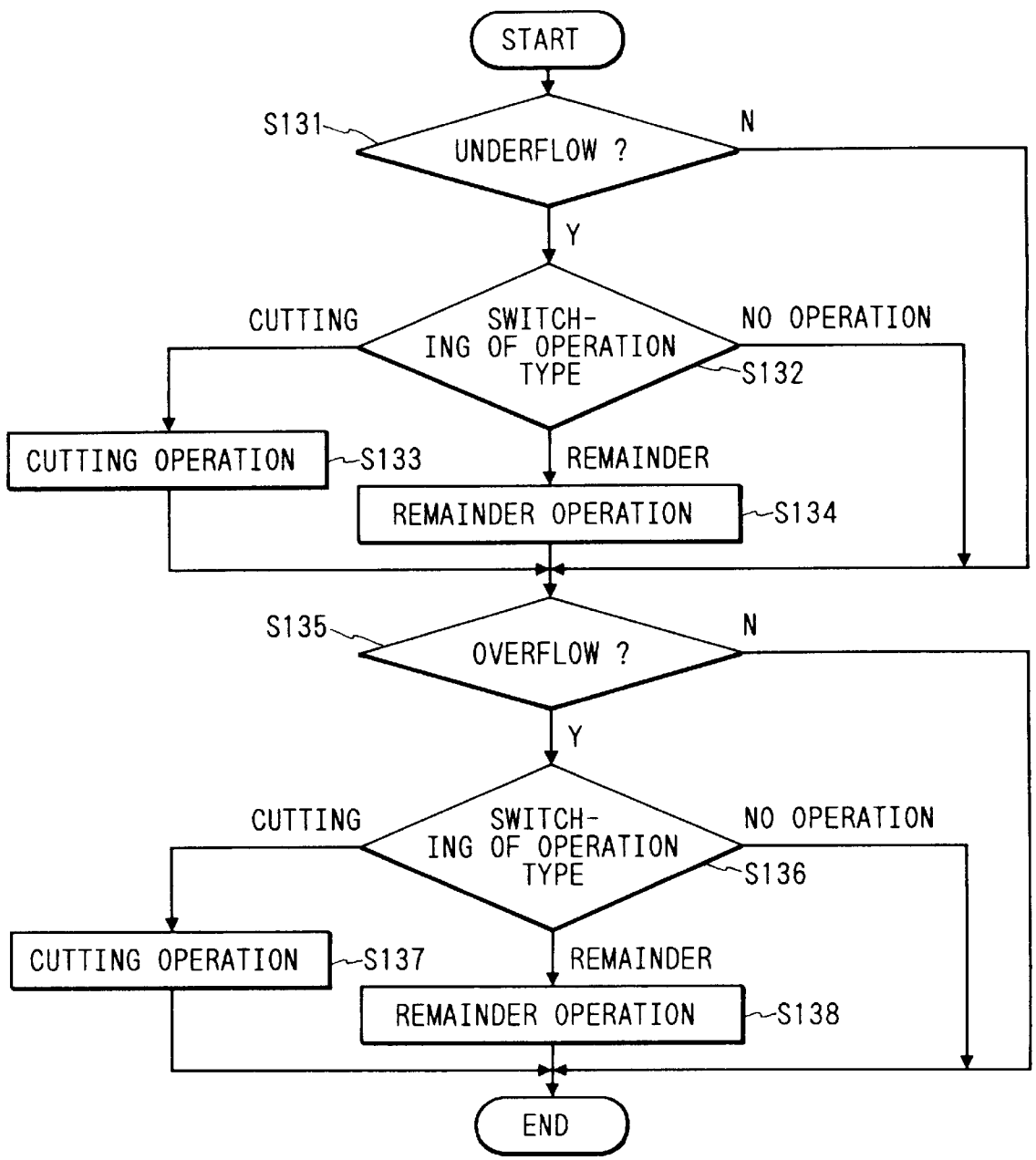
FIG. 13 is a flowchart showing an example of a color values rounding process.

FIG. 13 is a flowchart showing the color values rounding process. In this example, specified one of a "cutting operation", a "remainder operation" and a "no operation" is effected for each case of overflow and underflow.

An overflow/underflow judgment in steps S131 and S135 is performed based on the "minimums/maximums of ranges" of the analysis results stored in the analysis results storing unit 26 (see FIG. 7). Specification in steps S132 and S136 of the operation to be effected in the occurrence of the overflow/underflow is performed using the entries of the "operations in the occurrence of overflow/underflow" (see FIG. 7).

When a color value exceeds the range, it is set at the minimum or maximum in the cutting operation (steps S133 and S137), set at a value obtained by adding to the minimum a remainder of the color value divided by the range (i.e., maximum—minimum) in the remainder operation (steps S134 and S138), and no operation is performed in the remaining case.

The cutting operation has an advantage that the reproduction range can be set. This operation is particularly effective where the ranges of the input values are fixed, as in the case of the look-up table referencing operation.

The remainder operation has an advantage that it can deal with coordinate systems such as the polar coordinate system and the cylindrical coordinate system in which coordinates return to original values after one round.

The "no operation" has an advantage that the error of a color value does not increase during the process. Further, it is possible to apply the process to only a part of the range by using a range that is smaller than the actual reproduction range and effecting the "no operation."

According to the second embodiment, in which selection can be made from a plurality of operation types as described above, the color values rounding processing can be performed in accordance of the purpose of the color values processing. (The degree of freedom is increased.)

Third embodiment

Figure 14:
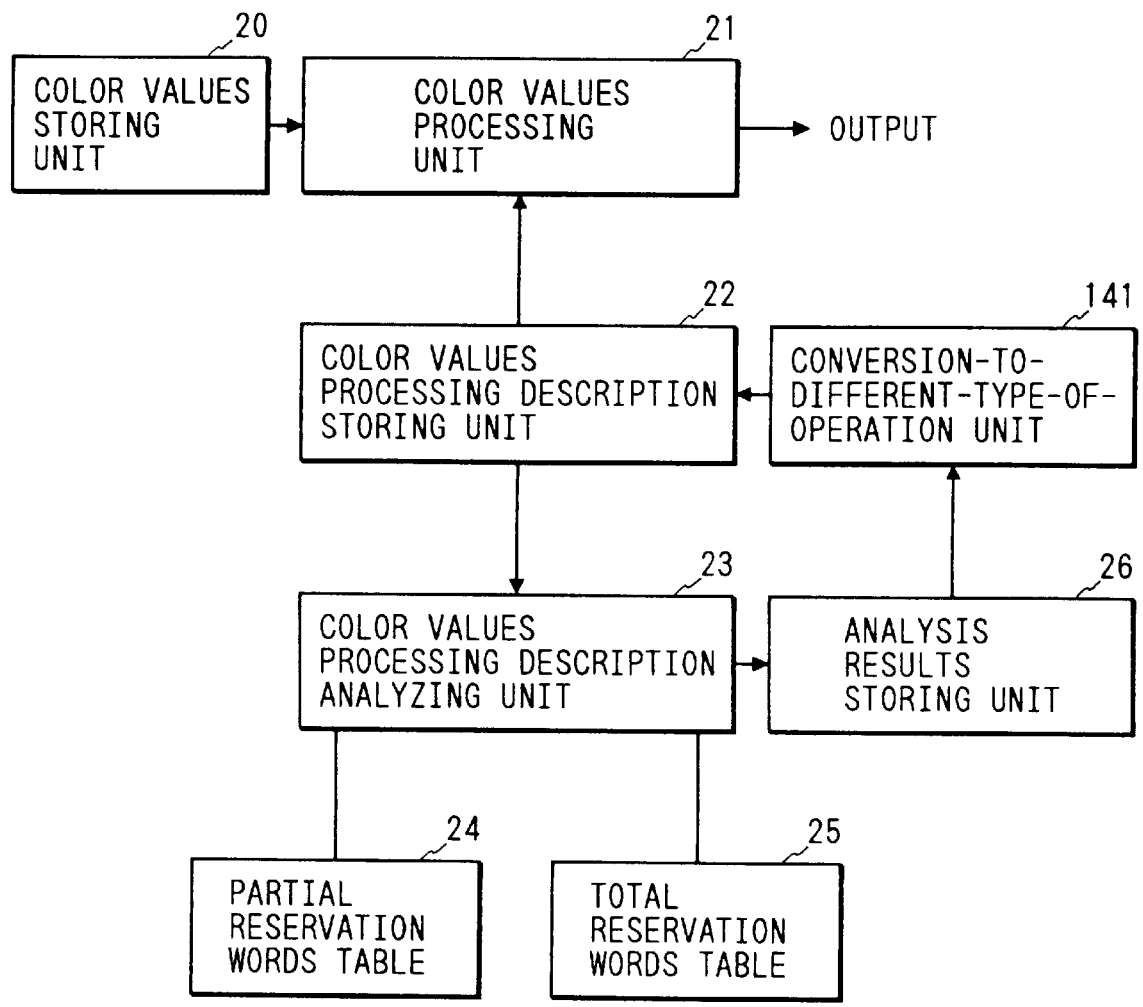
FIG. 14 is a block diagram showing a third embodiment of the invention.

FIG. 14 is a block diagram showing constitution of a third embodiment.

Figure 9:
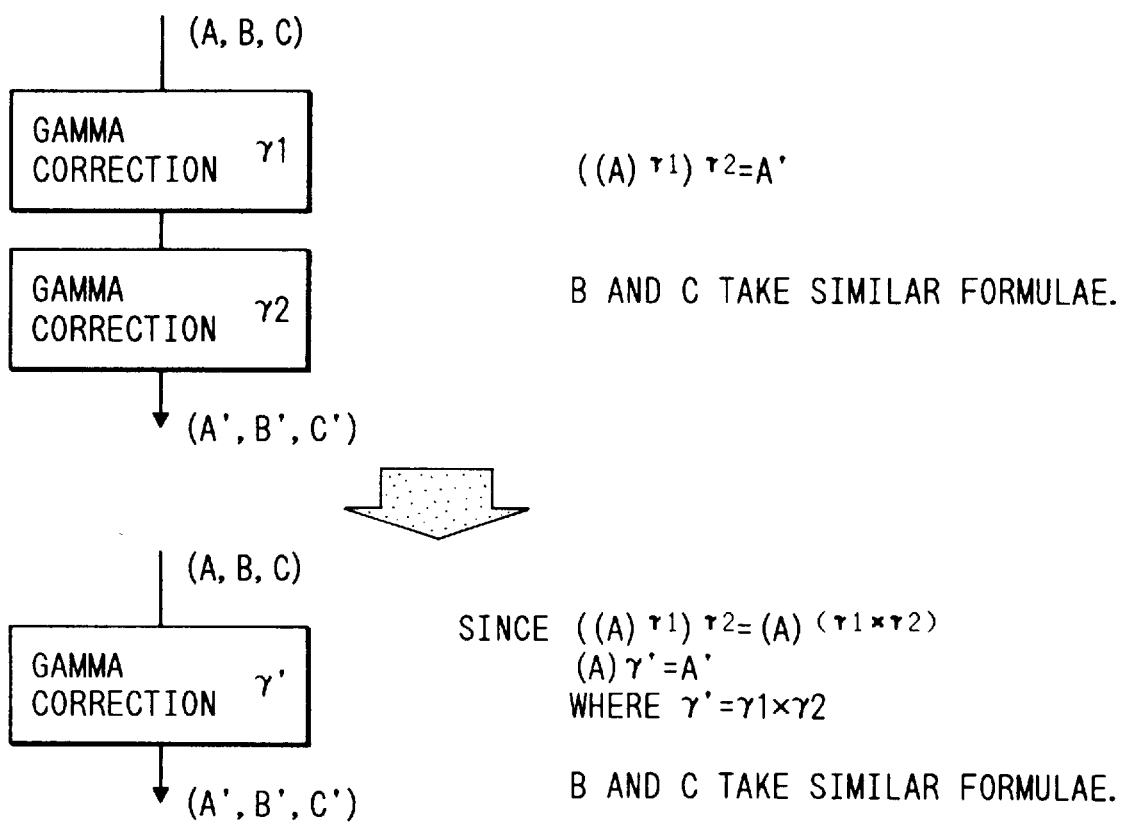
FIG. 9 shows a conversion from two consecutive gamma correcting operations to a single gamma correcting operation.
Figure 10:
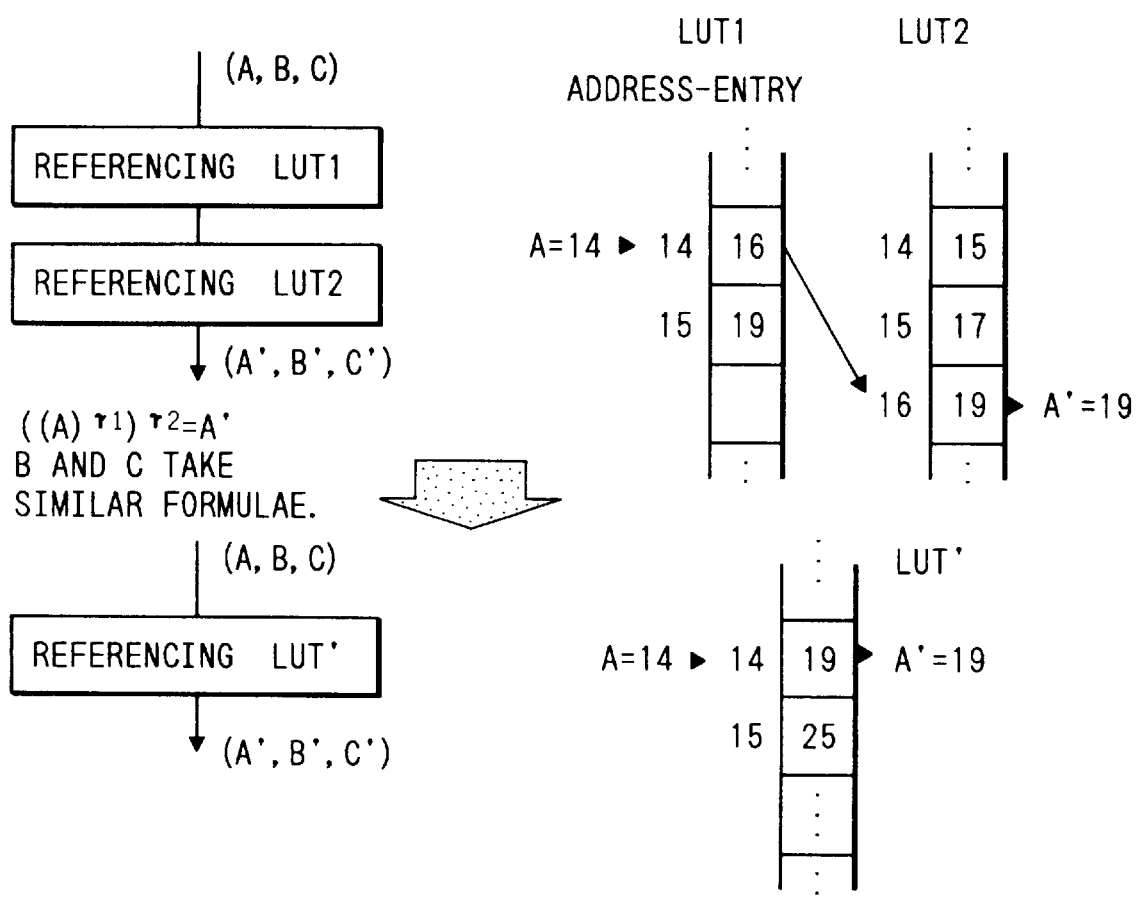
FIG. 10 shows a conversion from two consecutive look-up table referencing operations to a single look-up table referencing operation.

In the reduction operation of the first embodiment (FIG. 2) and the second embodiment (FIG. 12), the same types of operations as shown in FIGS. 8–10 are altered, i.e., unified. On the other hand, in the third embodiment, an operation is converted to a different type of operation.

An apparatus according to the third embodiment has the color values storing unit 20, color values processing unit 21, color values processing description storing unit 22, color values processing description analyzing unit 23, partial reservation words table 24, total reservation words table 25 and analysis results storing unit 26, which are the same as in the above embodiments. Further, the apparatus of the third embodiment has a conversion-to-different-type-of-operation unit 141 instead of the color values processing description reduction unit 27. The unit 141 performs conversion to a different type of operation such as rendering into an integer, a look-up table operation (one-dimensional), a direct look-up table operation (three- or four-dimensional).

The rendering into an integer may be implemented by a judgment portion for judging whether operations of a described processing procedure are performed in the form of a real number, and a processing procedure replacing portion for replacing a real number operation with an integer operation. (These two portions are not shown in the drawings.) The rendering into an integer simplifies calculations of the color values processing and thereby reduces the processing cost.

Examples of the conversion to a look-up table (one-dimensional) include replacement of a normalizing operation, gamma correction, logarithmic correction, etc. with a look-up table referencing operation. In this conversion, output values of a one-input/one-output type operation are calculated in advance for input values in a predetermined range, to enable table referencing. This conversion is particularly effective in the case where a complex real number operation, such as gamma correction or logarithmic correction, is required.

Another example of the rendering into an integer is replacement with a fixed point operation/conversion of matrix coefficients to a look-up table.

In the direct look-up table referencing operation, a three-dimensional array is accessed using input three stimuli of the three primary colors as addresses. In particular, in the case of an integer operation, any processing procedure can be represented by a direct look-up table. Therefore, a plurality of operations can be unified to a single operation using a direct look-up table. More specifically, actual color processing is performed for all the combinations of input three stimuli of the three primary colors, and results are employed as entries of a direct look-up table. In this manner, a direct look-up table referencing operation equivalent to the actual color values processing can be obtained.

In general, the direct look-up table referencing operation is performed at high speed. Therefore, the conversion to a direct look-up table enables any color values processing to be performed in a minimum processing time.

Fourth embodiment

Figure 15:
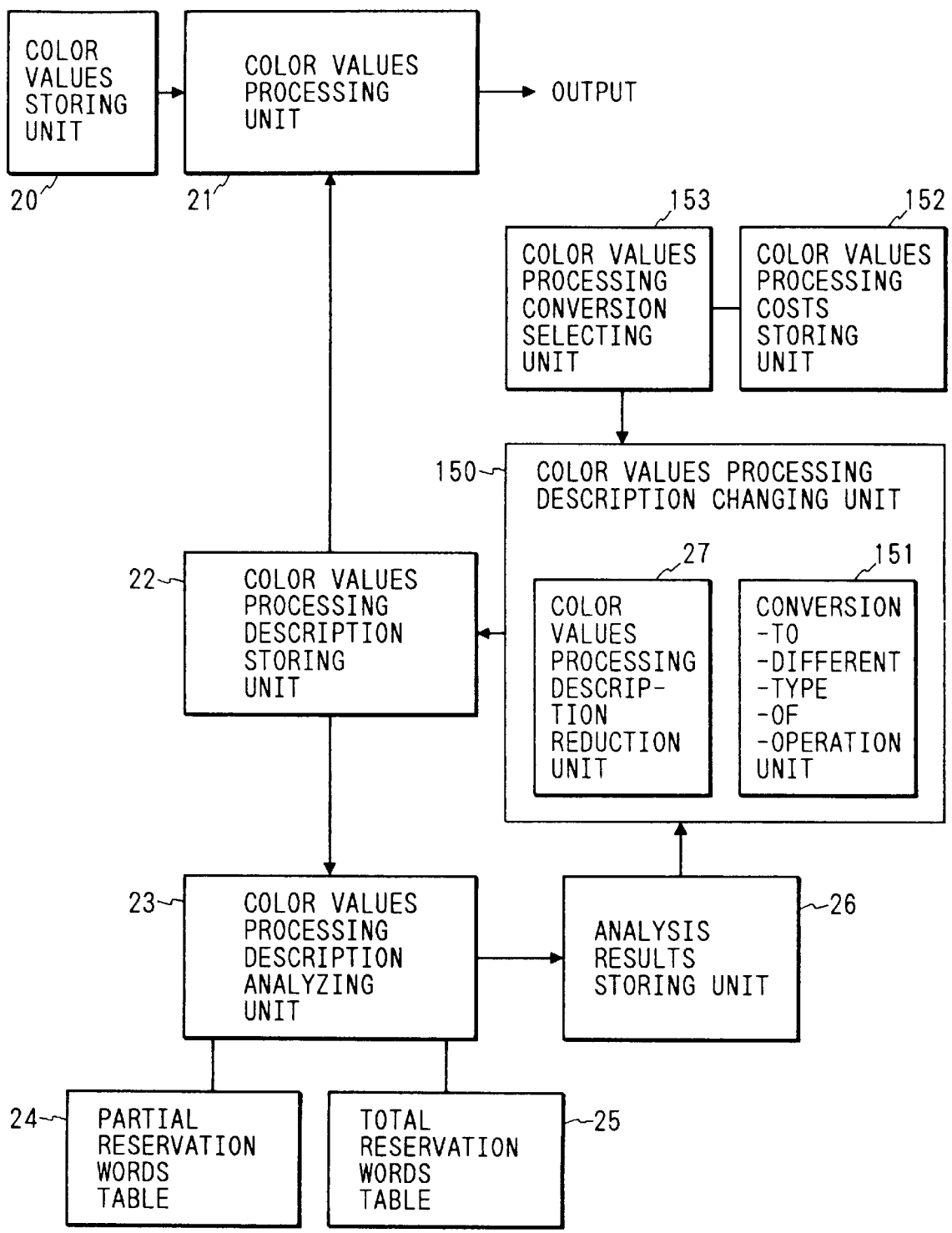
FIG. 15 is a block diagram showing a fourth embodiment of the invention.

FIG. 15 shows constitution of a fourth embodiment. A color values processing description changing unit 150 has both of the color values processing description reduction unit 27 and the conversion-to-different-type-of-operation unit 151. Conversions are selected so as to minimize the processing cost. To this end, further provided are a color values processing costs storing unit 152 for storing costs of respective operations of the color values processing description, and a color values processing conversion selecting unit 153 for selectively using conversions of the unit 27 or unit 151 based on the values stored in the color values processing costs storing unit 152.

As an example of data to be stored in the color values processing cost storing unit 152, part (a) of FIG. 16 shows a processing cost difference table including cost differences due to various conversions. The color values processing conversion selecting unit 153 employs conversions which reduce the processing cost. In the case of the cost difference table of part (a) of FIG. 16, the processing cost is reduced (with a large effect of replacement) by replacing the gamma correction with the look-up table referencing operation. Therefore, this replacement is effected.

In machines having such hardware as a coprocessor and an accelerator, a processing cost difference table as shown in part (b) of FIG. 16 is provided. Since there exists no cost difference between the gamma correction and the look-up table reference operation (no effect of replacement), this conversion is not effected. Therefore, the color values processing description reduction unit 27 is selected.

As described above, the fourth embodiment has an advantage that the operation replacement can be effected suitably for various machines by providing processing costs tables that reflect characteristics of the respective machines.

Fifth embodiment

Figure 17:
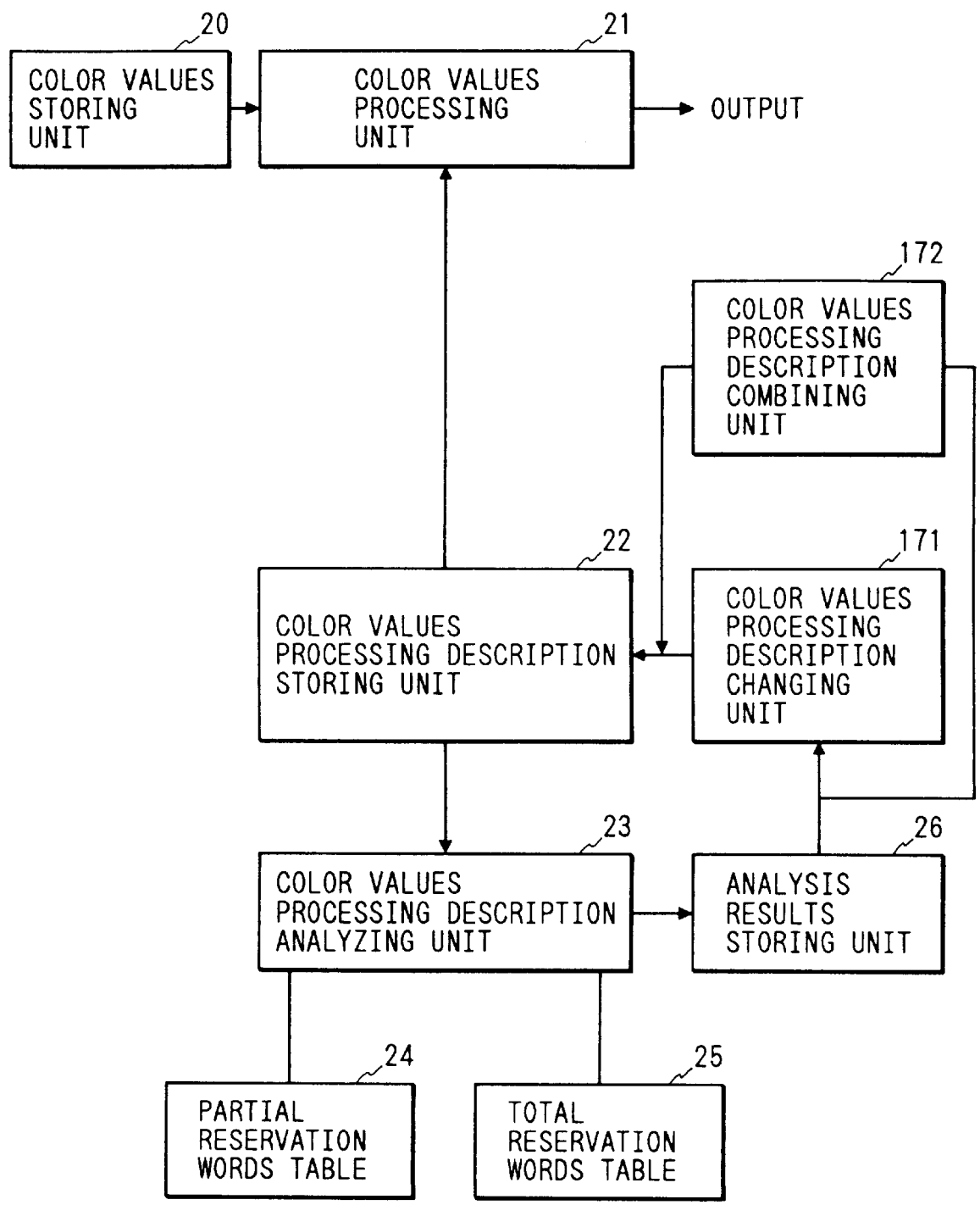
FIG. 17 is a block diagram showing a fifth embodiment of the invention.

FIG. 17 is a block diagram showing constitution of a fifth embodiment, which is characterized by a color values processing description combining unit 172 for combining a plurality of color values processing descriptions.

For example, if a processing description for conversion from the RGB color space for a scanner to the XYZ color space and a processing description for conversion from the XYZ color space to the CMY color space for a printer are performed sequentially, the RGB color space for the scanner can be converted to the CMY color space for the printer. Therefore, a processing description for a direct conversion from the RGB color space for the scanner to the CMY color space for the printer is prepared by combining, in advance, the two processing descriptions by means of the color values processing description combining unit 172.

In the case of the processing description structure shown in FIG. 7, a combined processing description is obtained by setting parameters of the first stage for the input color space, parameters of the second stage for the parameters of the output color space/range processing, and a combination of two processing procedure lists for the processing procedure list.

Figure 18:
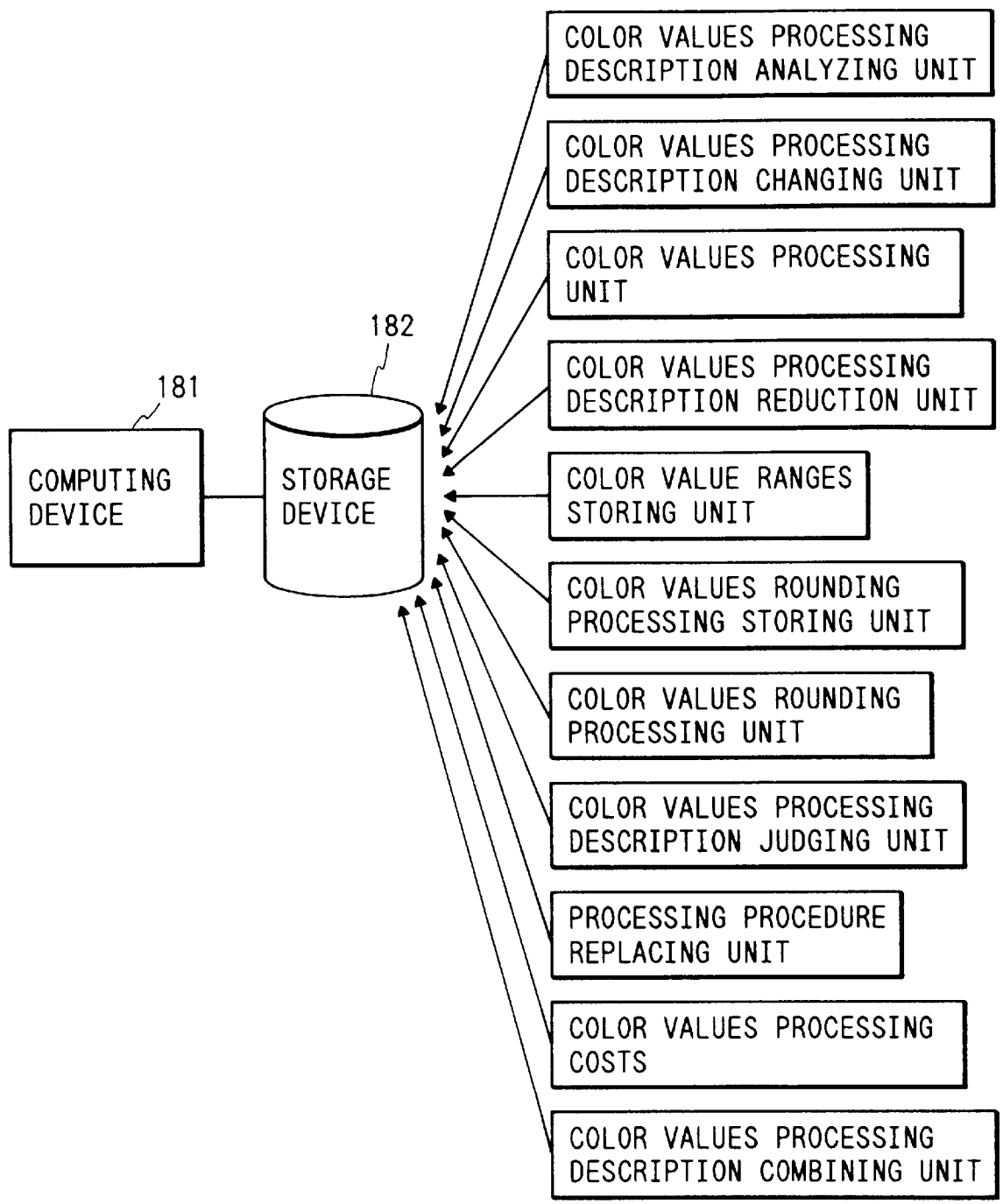
FIG. 18 is a block diagram showing least hardware constitution for implementing the invention.

FIG. 18 shows an example of least hardware constitution for implementing the color values processing apparatuses of the above embodiments. Programs and necessary data for the processes of the respective units are stored in a storage device 182, and a computing device 181 executes the respective programs.

According to the invention, since the color values processing description is simplified/optimized by the color values processing description changing means, the color values processing can be performed at high speed and with high accuracy.

Further, since the present invention makes it possible to describe a process without depending on the device that performs the process, not only the degree of freedom of the device constitution and the process is increased, but also the device constitution can be reduced, for instance, operation devices of the color values processing can be put together so as to be placed at a single location.

What is claimed is:

1. A color values processing apparatus comprising:
   means for storing a color values processing description that defines a procedure of color values conversion between color processing systems;
   means for analyzing the stored color values processing description, to thereby detect a type of a particular procedure in the stored color values processing description, wherein the type includes at least one of the following: normalization, gamma correction, log correction, LUT referencing, and a matrix operation;
   means for changing the particular procedure in accordance with the detected type to perform at least one of normalization, gamma correction, log correction, LUT referencing and a matrix operation; and
   means for converting color values of a first color processing system to color values of a second color processing system by using the color values processing description including the changed procedure.

2. The color values processing apparatus of claim 1, wherein the changing means comprises means for converting a plurality of consecutive operations of the same type included in the procedure to a single operation.

3. The color values processing apparatus of claim 2, wherein the converting means converts a plurality of consecutive normalizing operations to a single normalizing operation.

4. The color values processing apparatus of claim 2, wherein the converting means converts a plurality of consecutive gamma correcting operations to a single gamma correcting operation.

5. The color values processing apparatus of claim 2, wherein the converting means converts a plurality of consecutive look-up table referencing operations to a single look-up table referencing operation.

6. The color values processing apparatus of claim 2, wherein the converting means converts the procedure to a single multi-dimensional direct look-up table referencing operation.

7. The color values processing apparatus of claim 1, further comprising:
   a rounding process unit including:
      means for storing ranges of the color values;
      means for storing data indicating a rounding operation to be performed when the color value exceeds the range; and
      means for performing the rounding operation indicated by the data.

8. The color values processing apparatus of claim 1, further comprising:
   means for judging whether the procedure is performed on a real number; and
   means for changing the procedure so that it is performed on an integer when the judging means has judged that the procedure is performed on a real number.

9. The color values processing apparatus of claim 1, wherein the changing means comprises means for storing costs of operations included in the procedure, and means for selecting conversions of the operations based on the costs.

10. The color values processing apparatus of claim 1, further comprising means for combining a plurality of color values processing descriptions into a single color values processing description.

11. The color values processing apparatus according to claim 1, wherein the color values of the first and second color values processing systems are color values of pixels of raster data.

* * * * *